United States Patent
Kafka et al.

(10) Patent No.: US 7,016,107 B2
(45) Date of Patent: Mar. 21, 2006

(54) LOW-GAIN REGENERATIVE AMPLIFIER SYSTEM

(75) Inventors: James D. Kafka, Palo Alto, CA (US); Jianping Zhou, Palo Alto, CA (US); Kevin Holsinger, Menlo Park, CA (US)

(73) Assignee: Spectra Physics, Inc., Mountain View, CA (US)

( * ) Notice: Subject to any disclaimer, the term of this patent is extended or adjusted under 35 U.S.C. 154(b) by 191 days.

(21) Appl. No.: 10/762,216

(22) Filed: Jan. 20, 2004

(65) Prior Publication Data
US 2005/0157381 A1    Jul. 21, 2005

(51) Int. Cl.
*H01S 3/00*    (2006.01)
(52) U.S. Cl. .......................................... 359/348; 372/98
(58) Field of Classification Search ................ 359/333, 359/348
See application file for complete search history.

(56) References Cited

U.S. PATENT DOCUMENTS

| | | | | |
|---|---|---|---|---|
| 4,191,928 | A | * | 3/1980 | Emmett ........................ 359/348 |
| 4,896,119 | A | * | 1/1990 | Williamson et al. ......... 359/348 |
| 5,239,408 | A | * | 8/1993 | Hackel et al. ............... 359/338 |
| 5,790,303 | A | * | 8/1998 | Weston et al. ............... 359/345 |
| 6,002,697 | A | | 12/1999 | Govorkov ..................... 372/34 |
| 6,150,630 | A | * | 11/2000 | Perry et al. ............. 219/121.68 |
| 6,197,133 | B1 | * | 3/2001 | Unternahrer et al. ........ 148/525 |
| 6,621,040 | B1 | * | 9/2003 | Perry et al. ............. 219/121.67 |
| 2002/0085608 | A1 | | 7/2002 | Kopf et al. .................... 372/75 |
| 2002/0110168 | A1 | | 8/2002 | Haumesser et al. ............ 372/39 |
| 2002/0126715 | A1 | | 9/2002 | Gerstenberger et al. ....... 372/22 |
| 2003/0147443 | A1 | | 8/2003 | Backus et al. ................. 372/70 |
| 2003/0189959 | A1 | | 10/2003 | Erbert et al. ................... 372/25 |

OTHER PUBLICATIONS

Rundle, W.J. A ruby laser modified for pulse-trnasmission mode cavity dumping. Journal of App. Phys. vol. 39, No. 11, pp. 5338-5339. Oct. 1968, USA.*
Olson, Ron. A Terawatt on a tabletop. Lasers and Optronics, vol. 11, No. 11, pp 13-14. Oct. 1992, USA.*
Brunner, F., et al., "240-FS Pulses with 22-W Average Power from a Mode-Locked Thin-DiskYb:KY (WO4)2 Laser", Optics Letters, vol. 27, No. 13, pp. 1162-1164, Jul. 1, 2002.
Innerhofer, E. et al., "60-W Average Power in 810-FS Pulses from a Thin-Disk Yb:YAG Laser", Optics Letters, vol. 28, No. 5, pp 367-369, Mar. 1, 2003.

(Continued)

*Primary Examiner*—Mark Hellner
*Assistant Examiner*—Ari M. Diacou
(74) *Attorney, Agent, or Firm*—Heller Ehrman LLP; Paul Davis

(57) ABSTRACT

A regenerative amplifier system that is optimized for low-gain gain media is provided. The system is configured to include a minimum number of intra-cavity elements while still eliminating the leakage of the seed pulses from the output beam. In addition, the contrast ratio of the amplified pulses is increased even considering the long build-up time that is required in low-gain regenerative amplifiers. This is accomplished using a single Pockels cell between the oscillator and amplifier to select a single seed pulse for the cavity, instead of using a Faraday isolator. This directs the unwanted seed pulses in a separate direction from the output pulse. When the amplified pulse exits the cavity, it is directed in a direction away from the oscillator by the same Pockels cell. Only one additional Pockels cell and one polarizer are required inside the regenerative amplifier cavity.

29 Claims, 5 Drawing Sheets

OTHER PUBLICATIONS

Südmeyer, T., et al., "High-Power Femtosecond Nonlinear Devices Pumped with a Mode-Locked Thin Disk Laser", Lasers and Electro-Optics Europe, p. 245, Jun. 22, 2003.

Paschotta, R., et al. "Ultrashort Pulses with High Average Power", Proceedings of the SPIE, vol. 5137, pp. 66-72, (2003).

U. Brauch, et al., "Multiwatt Diode-Pumped Yb:YAG Thin Disk Laser Continuously Tunable Between 1018 and 1053 nm", Optics Letters, vol. 20, No. 7, pp. 713-715, Apr. 1, 1995.

A Beyertt, et al., "CPA-free Femtosecond Thin Disk Yb: KYW Regenerative Amplifier with High Repetition Rate", Advanced Solid State Photonics 2004.

M.J. Lederer, et al., Femtosecond Diode Pumped Reenerative Amplifier for Micromachining and Biomedical Applications Producing 250fs, 3$\mu$ J-pulses at 100kHz, Conference on Lasers and Electo-Optics, 2004.

H. Liu, et al., "Yb:KGd (WO4)2 Chirped-Pulse Regenerative Amplifiers" Optics Communications, 203:315-321, 2002.

Antoine Courjaud, et al.,"Diode Pumped Multikilohertz Femtosecond Amplifier", Advanced Solid State Phontonics, 2002.

A. Beyertt, et al., "Femtosecond Thin Disk Yb:KYW Regenerative Amplifier without CPA", Advanced Solid State Photonics, pp. 372-375, 2003.

Detlef Nickel, et al., "Ultrafast Thin-Disk Yb:KY(WO4)2 Regenerative Amplifier with a 200 kHz Repetition Rate", Optical Letters, vol. 29, No. 23, pp. 2764-2766, Dec. 1, 2004.

Tatsuya Tomaru, "Two-Element-Cavity Femtosecond CR4+:YAG Laser", Conference on Lasers and Electro-Optics, 2001.

J. Limpert, et al., "All Fiber CPA System based on Air-Guiding Photonic Badgap Fiber Compressor", Confernce on Lasers and Electro-Optics, Optical Society of America, pp. 1-2, 2003.

A. Tünnermann, et al. High Power Femtosecond Fiber CPA Systems-Design and Applications, Conference on Lasers and Electro-Optics, Optical Society of America, pp. 1-2, 2003.

J. Limpert, High-Average-Power Femtosecond Fiber Chirped-Pulse Amplification System, Optics Letters, vol. 28, No. 20, pp. 1984-1986, Oct. 15, 2003.

J. Limpert, et al., "All Fiber Chirped-Pulse Amplification System Based on Compression in Air-Guiding Photonic Bandgap Fiber", Optical Society of America Optics Express, vol. 11, No. 24, pp. 3332-3337, Dec. 1, 2003.

R. Maleck-Rassoul, et al., "Sub-40 fs Pulses from a 500 fs Green-Pumped Single-Pass Noncollinear Parametric Amplifier", Optical Society of America, Advanced Solid State Photonics, 2002.

C. Hönninger, et al., "Diode-Pumped Thin-Disk Yb:YAG Regenerative Amplifier", Applied Physics B (laser and Optics), 65:423-426, 1997.

http://www.imra.com/lasers-prod-fcpa.html,IMRAAmerica, Inc., "FCPA $\mu$Jewel Series".

http://www.amplitude-systemes.com/sPulse.htm, Amplitude Systems, "S-Pulse Femtosecond Amplifier".

Bado, P. et al., "Nd:YLF Mode-Locked Oscillator and Regenerative Amplifier"; Optics Letters; May 1987; vol. 12, No. 5; pp. 319-321.

Bagnoud, V. et al. "Diode-Pumped Regenerative Amplifier Delivering 100-mj Single-Mode Laser Pulses"; Optics Letters; Mar. 15, 2001; vol. 26, No. 6; pp. 337-339.

Balembois, F. et al., "High-Repetition-Rate Cw-Pumped $Cr^3$+: LiSrAlF6 Fermtosecond Regenerative Amplifier"; Optics Letters, vol. 18, No. 15; Aug. 1, 1993; pp. 1250-1252.

Barty, C.J. et al., "Regenerative Pulse Shaping and Amplification of Ultrabroadband Optical Pulses"; Optics Letters; Feb. 1, 1996; vol. 21, No. 3; pp. 219-221.

Barty, C.J. et al., "Generation of 18-fs, Multiterawatt Pulses by Regenerative Pulse Shaping and Chirped-Pulse Amplification"; Optics Letters; vol. 21, No. 9; May 1, 1996; pp. 668-670.

Beaud, P. et al., "8-TW 90-fs Cr:LiSAF Laser"; Optics Letters; vol. 18, No. 18; Sep. 15, 1993; pp. 1550-1552.

Braun, A. et al., "Diode-Pumped Nd:Glass Kilohertz Regenerative Amplifier For Subpicosecond Microjoule Level Pulses"; Applied Optics; vol. 36, No. 18; Jun. 20, 1997; pp. 4163-4167.

Coe, J.S. et al., "Regenerative Amplification of Picosecond Pulses in Nd:YLF:Gain Narrowing and Gain Saturation"; J. Opt. Soc.Am.B; vol. 5, No. 12; Dec. 1998; pp. 2560-2563.

Dawson, M. et al., "Characterization of a High-Gain Picosecond Flash-Lamp-Pumped Nd:YAG Regenerative Amplifier"; Optics Letters; vol. 13, No. 11; Nov. 1988; pp. 990-992.

Dimmick, T. "Semiconductor-Laser-Pumped, cw mode-locked Nd: Phosphate Glass Laser Oscillator and Regenerative Amplifier"; Optics Letters; vol. 15, No. 3; Feb. 1, 1990; pp. 177-179.

Durfee, C.G. et al., "Pulse Compression in a Self-Filtering Nd: YAG Regenerative Amplifier"; Optics Letters; vol. 17, No. 1; Jan. 1, 1992; pp. 37-39.

Evans, J.M. et al., "Kilohertz Cr: Forsterite Regenerative Amplifier"; Optics Letters; vol. 23, No. 21, Nov. 1, 1998; pp. 1692-1694.

Fu, Q. et al., "High-Average-Power Kilohertz-Repetition-Rate Sub-100-fs Ti:Sapphire Amplifier System"; Optics Letters; vol. 22, No. 10, May 15, 1997; pp. 712-714.

Gifford, M. et al., "Diode-Pumped Nd:YLF Regenerative Amplifier"; Optics Letters; vol. 17, No. 24; Dec. 15, 1992; pp. 1788-1790.

Hankla, A.K. et al., "Tunable Short-Pulse Beat-Wave Laser Source Operating at 1 $\mu$m", Optics Letters, vol. 22, No. 22; Nov. 15, 1997; pp. 1713-1715.

Hariharan, A. et al., "Alexandrite-Pumped Alexandrite Regenerative Amplifier For Femtosecond Pulse Amplification", Optics Letters, vol. 21, No. 2, Jan. 15, 1996; pp. 128-130.

Hofer, M. et al., "Regenerative Nd:Glass Amplifier Seeded With a Nd: Fiber Laser", Optics Letters; vol. 17, No. 11; Jun. 1, 1992; pp. 807-809.

Horvath, C. et al., Compact Directly Diode-Pumped Femtosecond Nd: Glass Chirped-Pulse-Amplification Laser System; Optics Letters; vol. 22, No. 23; Dec. 1, 1997; pp. 1790-1792.

Hyde, S.C.W. et al., "Argon-Ion-Pumped and Diode-Pumped All-Solid-State Femtosecond Cr:LiSrAlF6 Regenerative Amplifiers"; Optics Letters; vol. 20, No. 2; Jan. 15, 1995; pp. 160-162.

Jonusauskas, J. et al., "54-fs, 1-GW, 1-kHz Pulse Amplification in Cr:forsterite"; Optics Letters, vol. 23, No. 24, Dec. 15, 1998; pp. 1918-1920.

Joo, T. et al., "Ti:sapphire Regenerative Amplifier for Ultrashort High-Power Multikilohertz Pulses Without an External Stretcher", Optics Letters, vol. 20, No. 4; Feb. 15, 1995; pp. 389-391.

Kawanaka, J. et al., "30mj, Diode-Pumped, Chirped-Pulse Yb:YLF Regenerative Amplifier", Optics Letters, vol. 28, No. 21; Nov. 1, 2003; pp. 2121-2123.

Kung, A.H., "Regenerative Amplification of a Single-Frequency Optical Parametric Oscillator", Optics Letters, vol. 18, No. 23; Dec. 1, 1993; pp. 2017-2019.

Liu, H. et al., "Directly Diode-Pumped Millijoule Subpicosecond Yb:glass Regenerative Amplifier", Optics Letters; vol. 24, No. 13; Jul. 1, 1999; pp. 917-919.

Liu, H. et al., "Directly Diode-pumped Yb:KY(WO4)2 Regenerative Amplifiers", Optics Letters; vol. 27, No. 9; May 1, 2002; pp. 722-724.

Mellish, R. et al., "Diode-Pumped Cr:LiSAF All-Solid-State Femtosecond Oscillator and Regenerative Amplifier"; Optics Letters; vol. 20, No. 22; Nov. 15, 1995; pp. 2312-2314.

Nabekawa, Y. et al., "Generation of 0.66-TW Pulses at 1 kHz by a Ti:sapphire Laser", Optics Letters; vol. 23, No. 17; Sep. 1, 1998; pp. 1384-1386.

Nabekawa, Y. et al., "Sub-20-fs Terawatt-Class Laser System With A Mirrorless Regenerative Amplifier and an Adaptive Phase Controller", Optics Letters; vol. 27, No. 14; Jul. 15, 2002; pp. 1265-1267.

Norris, T.B. "Femtosecond Pulse Amplification at 250 kHz With a Ti:sapphire Regenerative Amplifier and Application to Continuum Generation", Optics Letters, vol. 17, No. 14; Jul. 15, 1992; pp. 1009-1011.

Ohno, K. et al., "Adaptive Pulse Shaping of Phase and Amplitude of an Amplified Femtosecond Pulse Laser By Direct Reference To Frequency-Resolved Optical Gating Traces", Opt. Soc. Am. B; vol. 19, No. 11; Nov. 2002; pp. 2781-2790.

Perry, M.D. et al., "Cr:LiSrAlF6 Regenerative Amplifier"; Optics Letters; vol. 17, No. 8; Apr. 15, 1992; pp. 604-606.

Raybaut, P. et al., "Directly Diode-Pumped $Yb^3+$:SrY4 (SiO4)3O Regenerative Amplifier", Optics Letters; vol. 28, No. 22; Nov. 15, 2003; pp. 2195-2197.

Reed, M. et al., "Widely Tunable Femtosecond Optical Parametric Amplifier at 250 kHz with a Ti:sapphire regenerative Amplifier", Optics Letters; vol. 19, No. 22; Nov. 15, 1994; pp. 1855-1857.

Ribeyre, X. et al., "Nd:glass Diode-Pumped Regenerative Amplifier, Multimillijoule Short-Pulse Chirped-Pulse Amplifier Laser", Optics Letters; vol. 28, No. 15; Aug. 1, 2003; pp. 1374-1376.

Rudd, J.V. et al., "Chirped-Pulse Amplification of 55-fs Pulses at a 1-kHz Repetition Rate in a Ti:Al2O3 Regenerative Amplifier", Optics Letters, vol. 18, No. 23; pp. 2044-2046.

Ruggiero, A.J. et al., "Regenerative Amplification of Picosecond Pulses in Nd:YAG at Repetition Rates in the 100-kHz Range"; Opt. Soc. Am. B, vol. 8, No. 10; Oct. 1991; pp. 2061-2067.

Selker, M. D. et al., "Efficient, Diode-Pumped, Diode-Laser-Seeded, High-Peak-Power Nd:YLF Regenerative Amplifier"; Optics Letters, vol. 19, No. 8; Apr. 15, 1994; pp. 551-553.

Song, J. et al., "Mid-Infrared Pulses Generated From the Mixing Output of an Amplified, Dual-Wavelength Ti:sapphire System"; Optics Letters; vol. 27, No. 3; Feb. 1, 2002; pp. 200-202.

Tian, C. et al., "Synchronous, Dual-wavelength, Injection-Seeded Amplification of 5-ns Pulses in a Flash-Lamp-Pumped Ti:sapphire Laser"; Optics Letters; vol. 24, No. 21; Nov. 1, 1999; pp. 1496-1498.

Turi, L. et al., "High-Power Longitudinally End-Diode-Pumped Nd:YLF Regenerative Amplifier", Optics Letters; vol. 20, No. 2; Jan. 15, 1995; pp. 154-156.

Vaillancourt, G. et al., "Operation of a 1-kHz Pulse-Pumped Ti:sapphire Regenerative Amplifier", Optics Letters; vol. 15, No. 6; Mar. 15, 1990; pp. 317-319.

Wang, X.D. et al., "Regenerative Pulse Amplification In the 10-kHz Range"; Optics Letters; vol. 15, No. 15; Aug. 1, 1990; pp. 839-841.

Wynne, K. et al., "Regenerative Amplification of 30-fs Pulses in Ti:sapphire at 5 kHz"; Optics Letters; vol. 19, No. 12; Jun. 15, 1994; pp. 895-897.

Yamakawa, K. et al., "Two-Color Chirped-Pulse Amplification In an Ultrabroadband Ti:sapphire Ring Regenerative Amplifier"; Optics Letters; vol. 28, No. 23; Dec. 1, 2003; pp. 2402-2404.

Yang, J. et al., "0.09-terawatt Pulses With a 31% Efficient, Kilohertz Repetition-Rate Ti:sapphire Regenerative Amplifier"; Optics Letters; vol. 26, No. 7; Apr. 1, 2001; pp. 453-455.

Zhang, Z et al., "Dual-Wavelength Chirped-Pulse Amplification System", Optics Letters; vol. 25, No. 8; Apr. 15, 2000; pp. 581-583.

* cited by examiner

LOW-GAIN REGENERATIVE AMPLIFIER SYSTEM

BACKGROUND OF THE INVENTION

1. Field of the Invention

This invention relates generally to a regenerative laser amplifier system and its methods of use, and more particularly to a low-gain regenerative amplifier system with a simplified configuration that eliminates the leakage of the seed laser.

2. Description of Related Art

Regenerative amplifiers are typically used to increase the energy of an optical pulse. These pulses can be of any duration but a particularly useful range includes ultrafast pulses with picosecond or femtosecond duration. The laser oscillators that produce these ultrafast pulses are often limited in the energy per pulse that they can produce with a typical energy being 1 to 100 nanojoules. A regenerative amplifier for these ultrafast pulses can increase the energy to the millijoule range, a gain of $10^6$.

A regenerative amplifier contains a gain medium surrounded by a resonant cavity. Within this cavity are means for switching the pulse in and out of the cavity. This is distinct from a multi-pass amplifier where there is no cavity or need to switch the pulse. In the case of the multi-pass amplifier, the pulse makes several trips at slightly different angles through the gain media. One advantage of the regenerative amplifier is that a larger number of passes through the gain media can be used, and thus a larger gain can be obtained.

A regenerative amplifier system contains not just the amplifier, the cavity and the means for switching the pulse, but also the oscillator and a means for isolating the oscillator from feedback. The oscillator produces a continuous train of pulses with a typical repetition rate of 80–100 MHz. The switching means is typically an electro-optic device but can also be an acousto-optics device. The most commonly used electo-optic device is a Pockels cell where a voltage is applied to a crystal and the polarization of the pulse passing through the cell is altered for example from horizontal polarization to vertical polarization. A polarizer is an optical device that passes horizontal polarization and reflects vertically polarized pulses. The Pockels cell, when used in conjunction with a quarter wave plate and the polarizer provides the means for switching the pulse in to or out of the cavity. For example, once the pulse has been trapped in the cavity and been amplified to the point where the gain has saturated and no further amplification is possible, a voltage would be removed from the Pockels cell and the polarization of the pulse would be rotated from horizontal to vertical during the next pass of the pulse through the Pockels cell and waveplate. When the pulse is then incident on the polarizer, it will be reflected from the cavity. This then constitutes the output beam of the regenerative amplifier.

There are several options for switching the pulse in to and out of the cavity. Two Pockels cells may be used as described in U.S. Pat. No. 5,790,303. One Pockels cell is used to switch the pulse in and the second is used to switch the pulse out. The pulse exits the regenerative amplifier from an intracavity polarizer. The pulse can be injected in the amplifier by another polarizer or off the Brewster surface of the gain medium, as shown in FIG. 4 of the patent. During the time before the seed pulse is switched into the cavity of the regenerative amplifier, the pulses from the oscillator enter the cavity, pass through the gain medium and are reflected back towards the oscillator itself. This poses a severe problem since ultrafast oscillators are very sensitive to feedback. Reflection of as little as 1% of the light output from the oscillator back into the oscillator can cause instability and large fluctuations. A Faraday isolator is required to block the train of seed pulses from the returning in the direction of the oscillator. Thus a typical regenerative amplifier system consists of two Pockels cells and one or two polarizers in the regenerative amplifier cavity and a Faraday isolator located between the oscillator and the regenerative amplifier.

Some gain media do not produce as much gain per pass as others. These low-gain gain media are usually chosen for the wavelength they operate at or the ability to produce shorter pulses. For low-gain regenerative amplifiers, it is imperative to reduce the losses per pass in the cavity. Thus most low-gain regenerative amplifiers use only a single Pockels cell and a single polarizer within the cavity. Thus the same polarizer and Pockels cell are used to switch the pulse in to and out of the cavity. This requires more sophisticated high voltage electronics to drive the Pockels cell. The problems of feedback of the seed pulse to the oscillator still exists and a Faraday isolator is almost always used to prevent this feedback. Occasionally, prior art systems have used a 4% reflector instead of the Faraday isolator, however this does a poor job of isolation. A new problem occurs however, when a single Pockels cell and polarizer are used. The seed pulses that are incident on the regenerative amplifier cavity prior to one pulse being switched in to the cavity are now rejected by the Faraday isolator and thus do not return to the oscillator. Instead, these seed pulses are directed to the output beam of the regenerative amplifier. Thus the output of the amplifier consists of a large number of undesired seed pulses in addition to the amplified pulse. An example of such a system is given in "Diode-pumped Nd:glass kilohertz regenerative amplifier for subpicosecond microjoule level pulses", by A. Braun, X. Liu, G. Mourou, D. Kopf and U. Keller, in Applied Optics vol. 36, no. 18 page 4163–4167. The authors state, "This background power level was 3 mW." They conclude that "both the background power level and postpulses could be eliminated with a suitable electro-optic pulse selector" although they do not demonstrate how this may be accomplished.

One other configuration is described in "8-TW 90-fs Cr:LiSAF laser", by P. Beaud, M. Richardson, E. J. Miesak and B. H. T. Chai, in Optics Letters vol. 18, no. 18, page 1550–1553. The authors use a single Pockels cell before the cavity to pick a single pulse for injection and a single Pockels cell and polarizer in the cavity to switch the pulse in. They do not switch the pulse out however and instead let a train of output pulses emerge from the end mirror of the cavity. Two additional Pockels are then required after the cavity to choose a single amplified pulse from this pulse train.

There is a need for a low-gain regenerative amplifier with a minimum of intra-cavity elements. There is a further need for a low-gain regenerative amplifier without leakage of the seed pulses as part of the output beam. There is yet a further need for a low-gain regenerative amplifier with a minimum number of expensive components. There is yet a further need for a low-gain regenerative amplifier with a high contrast ratio.

SUMMARY OF THE INVENTION

Accordingly, an object of the present invention is to provide low-gain regenerative amplifiers, and their methods of use, that do not require a Faraday isolator.

Another object of the present invention is to provide low-gain regenerative amplifiers, and their methods of use, that have an improved contrast ratio.

Yet another object of the present invention is to provide low-gain regenerative amplifiers, and their methods of use, that allow the full power of the seed laser to be used as the seed.

Yet another object of the present invention is to provide low-gain regenerative amplifiers, and their methods of use, that do not allow the undesired seed pulses to enter the regenerative amplifier and pass through the gain, therefore maximizing the gain available for the desired seed pulse.

These and other objects of the present invention are achieved in a regenerative amplifier system. A pump source produces a pump beam. First and second mirrors define a resonant cavity. A gain medium is positioned in the resonant cavity and is optically coupled to the pump source. An oscillator produces multiple seed pulses. A first electro-optic switch is positioned external to the cavity. The first electro-optic switch provides selection of a single seed pulse for the cavity, and directs an amplified pulse produced in the cavity in a direction away from the oscillator. A second electro-optic switch is positioned in the cavity and switches the seed pulse in and out of the cavity.

In another embodiment of the present invention, a method is provided for producing an amplified pulse from a regenerative amplifier system. A pump beam is produced from a pump source. Multiple seed pulses are produced from the oscillator. A single seed pulse is selected for the cavity. The seed pulse is switched in and out of the cavity. An amplified pulse produced in the cavity is directed in a direction away from the oscillator. This increases the contrast ratio of the amplified pulse to the pre-pulses.

In another embodiment of the present invention, a method for producing an amplified pulse provides a regenerative amplifier system that includes a cavity, gain medium, an electro-optic switch for switching a pulse in to and out of the amplifier and an oscillator. A pump beam is produced from a pump source. Multiple seed pulses are produced from the oscillator. A seed pulse is switched in and out of the cavity. A high voltage pulse is generated with on and off voltage edges to drive the electro-optic switch. The on and off voltage edges are applied to the electro-optic switch and are synchronized by counting pulses from the oscillator.

DETAILED DESCRIPTION OF THE PREFERRED EMBODIMENT

Figure 1:
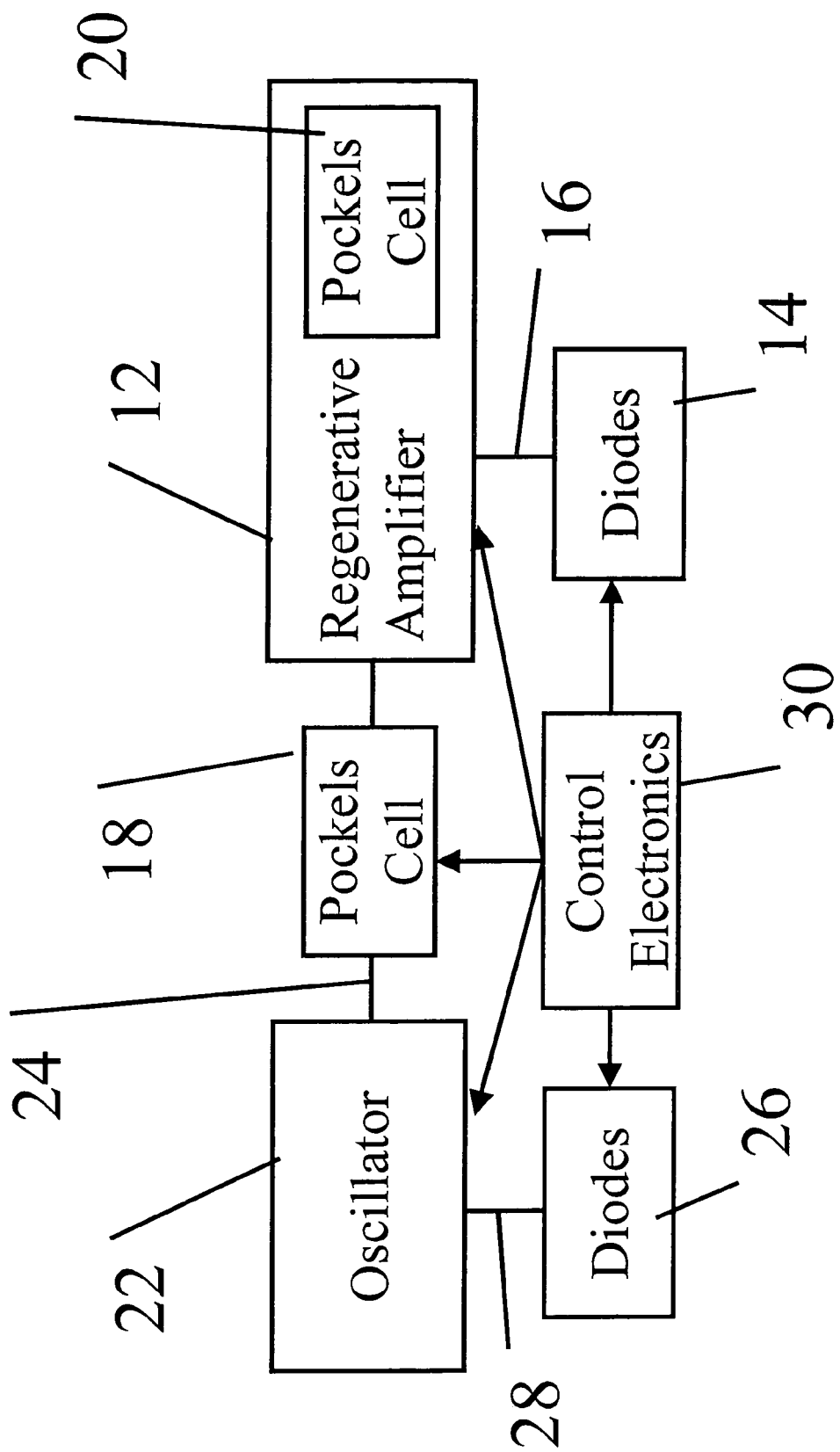
FIG. 1 is a schematic diagram illustrating one embodiment of a regenerative amplifier system of the present invention with a diode pumped oscillator and a diode pumped regenerative amplifier.

As illustrated in FIG. 1, in one embodiment of the present invention, a regenerative amplifier system, generally denoted as 10, includes a regenerative amplifier cavity 12 and a pump source 14 that produces a pump beam 16. The power of pump beam 16 can vary. In various embodiments, pump beam 16 can a power in the range of, of 1–100 W, 1–30 W, 1–10 W, and the like. The amount of pump power is selected depending on the output power desired. Pump beam 16 can have a variety of wavelengths, including but not limited to a wavelength in the range of 800 to 1000 nm.

A first electro-optic switch 18 is positioned external to regenerative amplifier cavity 12 (hereafter "cavity 12"). A second electro-optic switch 20 is positioned in cavity 12. An oscillator 22 is coupled to first electro-optic switch 18 and produces multiple seed pulses 24.

A pump source 26 produces a pump beam 28 for oscillator 22. In various embodiments, pump source 26 can be selected from a diode, a diode bar, a fiber-coupled diode bar, and a single fiber coupled diode-bar. In one specific embodiment pump source 26 is a single fiber-coupled diode source. Control electronics 30 are coupled to pump sources 14 and 26, to first electro-optic switch 18, and to second electro-optic switch 20.

Figure 2:
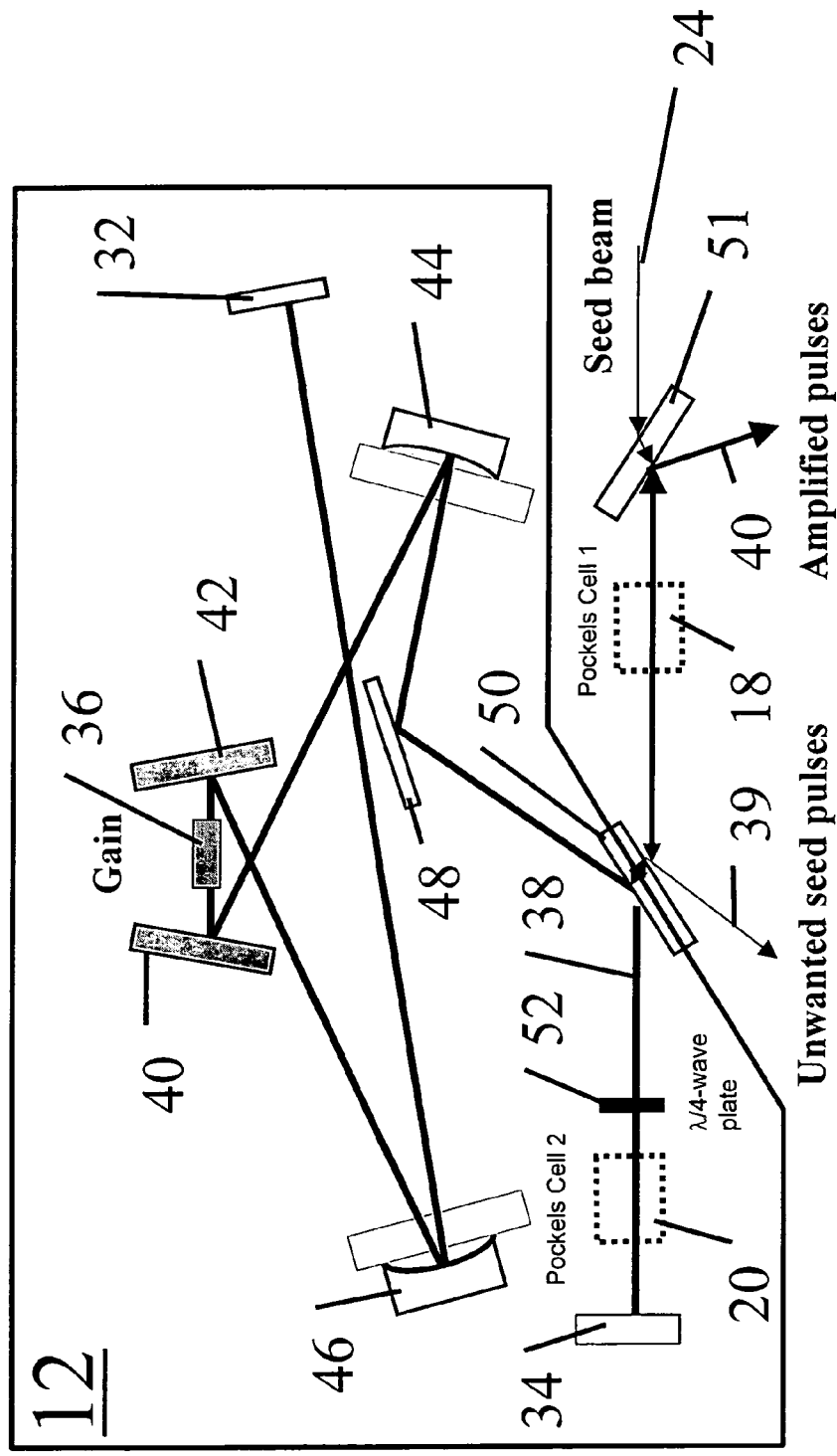
FIG. 2 is a schematic of the FIG. 1 regenerative amplifier system illustrating placement of the gain media, mirrors, a waveplate, polarizers and two electro-optic switches.

FIG. 2 illustrates an embodiment of regenerative amplifier system 10 in more detail. First and second end mirrors 32 and 34 define cavity 12, which is a resonant cavity. A gain medium 36 is positioned in cavity 12 and is optically coupled to pump source 14. First electro-optic switch 18 selects a single seed pulse 38 from the multiple seeds pulses 24 from oscillator 22. In various embodiments, single seed pulse 38 can have a duration in the range of about 100 fs, 300 fs, about 1 ps, and the like, depending on the gain media used in the oscillator.

The seed pulse from the oscillator can be stretched by, for example, a prism pair dispersive delay line, a grating pair dispersive delay line, a Gires-Tournois interferometer or the like. The stretched seed pulse 38 can have a duration in the range of about 100 ps, 300 ps, about 1 ns, and the like, depending on the stretching configuration chosen. The purpose of stretching the seed pulse is to avoid damage in the regenerative amplifier due to high peak powers and to avoid nonlinear effects in the gain medium, such as Raman generation, for example.

The unwanted seed pulses 39 are directed away from cavity 12. First electro-optic switch 18 directs an amplified pulse 40, produced in cavity 12, in a direction away from oscillator 22. Second electro-optic switch 20 switches single seed pulse 38 in and out of cavity 12. First and second electro-optic switches 18 and 20 can be Pockels cells, electro-optic deflectors, acousto-optic modulators and the like.

As illustrated in FIG. 2, gain medium 36 can be positioned between two fold mirrors, 40 and 42, which can be AR coated for the pump wavelength and HR coated for the amplified pulses. A variety of different gain media 36 can be utilized including but not limited to, Yb:KGW, Yb:KYW, Yb:YAG, Yb:SYS, Yb:BOYS, Yb:GdCOB, Yb:glass, Nd:KGW, Nd:glass, Cr:LiSAF, Cr:LiCAF, Ti:sapphire, Nd:YAG, Nd:YLF, Nd:YVO$_4$, and the like. In one embodiment, Yb:KGW is used as gain media 36.

One advantageous property of the Yb doped materials is that the absorption bands are quite broad as a function of wavelength as disclosed in application Ser. No. 10/233,138. For example, a Yb:KGW laser can be pumped with any wavelength between 940 nm and 950 nm with a minimal change in output power. The diode lasers that are used for pumping change their wavelength as they age. Typically a diode laser will drift a few nm from the beginning of life until the end of life. For Nd doped materials with narrow absorption bands, the diode temperature must be decreased during the life of the diode to keep the pump wavelength constant. For the Yb doped materials with broad absorption bands, the temperature can be kept constant. As a result, a colder initial temperature can be used and the lifetime of the diodes will then be increased.

Cavity 12 can include any number of different fold mirrors, in the FIG. 2 embodiment, fold mirrors 44, 46 and 48 are provided. Fold mirror 50 is a polarizer that reflects vertical polarization and passes horizontal. Polarizer 51 is oriented to reflect horizontal and pass vertical polarization. A quarter wave plate 52 can also be included for the purpose of rotating the polarization of the pulses in the cavity. In this configuration, the cavity is closed or high loss when no voltage is applied to the Pockels cell and open or low loss when the quarter wave voltage is applied. In an alternative embodiment, the quarter wave plate may be eliminated from the cavity by tilting the Pockels cell to an angle such that it contributes a quarter wave of retardation when no voltage is applied.

Figure 3:
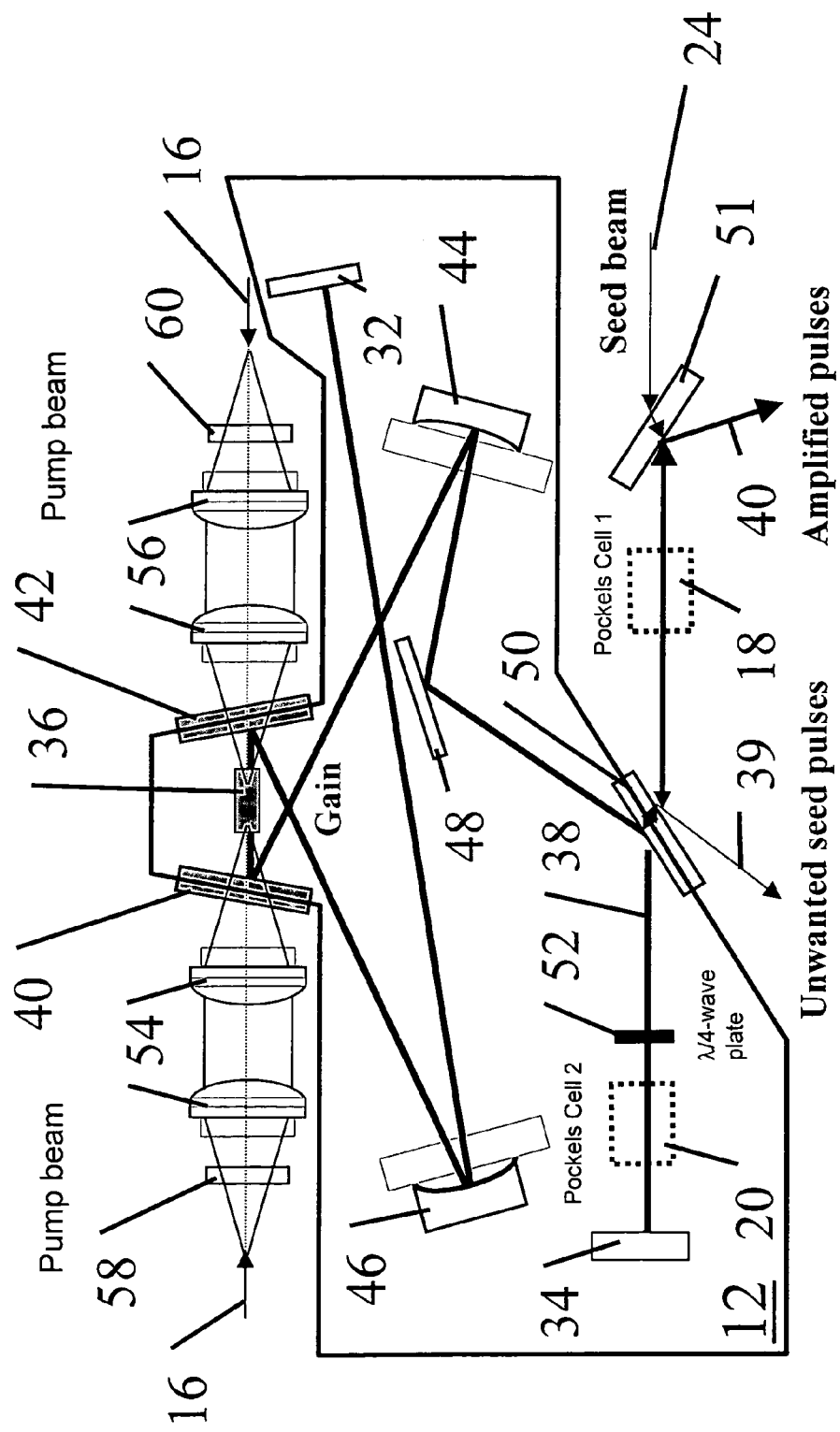
FIG. 3 is a schematic diagram of a regenerative amplifier system of the present invention illustrating the pump beams for the gain medium.

As illustrated in FIG. 3, one or more telescopes 54 and 56, which include optical elements such as focusing lenses, can be provided, to direct pump beam(s) 16 into cavity 12. Polarization scramblers 58 and 60 are included to scramble the polarization of the pump beam after it is transmitted through the fiber.

In one embodiment of the present invention, regenerative amplifier system 10 provides a method for producing amplified output pulses 40. Pump beam 16 is produced from pump source 14. Multiple seed pulses 24 are produced from oscillator 22. A single seed pulse 38 is selected for cavity 12. Seed pulse 38 is switched in and out of cavity 12. Amplified pulse 40, produced in cavity 12, is directed in a direction away from oscillator 22.

Figure 4:
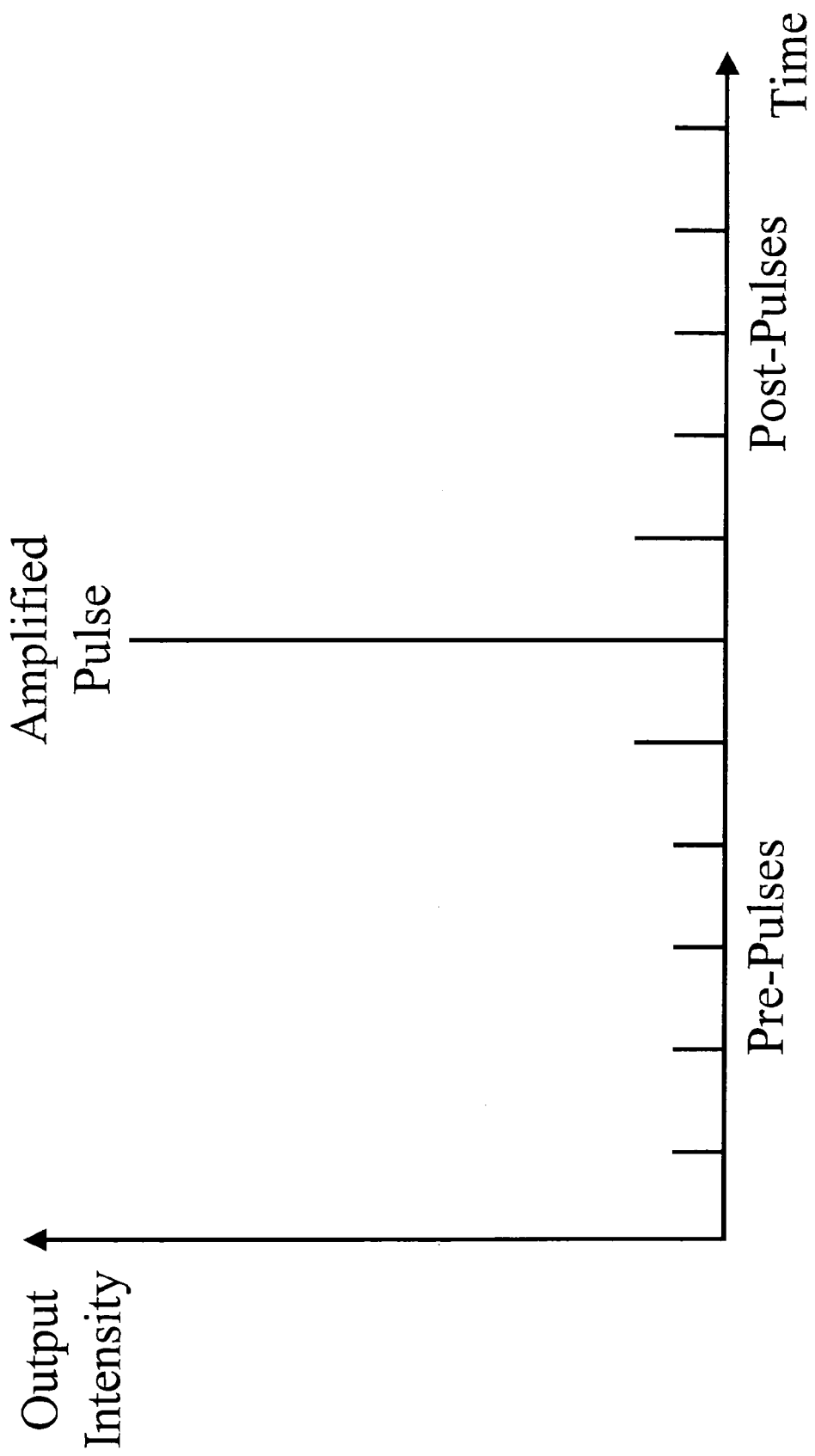
FIG. 4 illustrates the output pulses of the FIG. 1 system as a function of time, with the main amplified pulse as well as the pre-pulse and post-pulses.

In FIG. 4, amplified output pulses are shown as a function of time. The pulse that is intentionally switched out from cavity 12 is shown as amplified output pulse 40. It is not possible to switch the entire amplified output pulse 40 from cavity 12, and thus a small pulses remains inside cavity 12. On each subsequent round trip around cavity 12, some of amplified output pulse 40 leaks out, leading to the post-pulses that are illustrated in FIG. 4. The ratio of the energy in amplified output pulse 40 to the post-pulse is called the post-pulse contrast ratio. By way of illustration, and without limitation, a typical value for the post-pulse contrast ratio can be 100 or 200.

As shown in FIG. 4 there pre-pulses can emerge from the regenerative amplifier system 10 prior to amplified output pulse 40. These pre-pulses are typically due to two sources. The first source is leakage of amplified output pulse 40 in previous round trips of cavity 12. This can be due to transmission of amplified output pulse 40 at an imperfect polarizer 50 or a non-optimal voltage applied to the Pockels cell 20 in the cavity. A second source of pre-pulses can occur if additional seed pulses 24 are switched in to cavity 12 at the beginning of the amplification process. The ratio of the energy in amplified output pulse 40 to the pre-pulse is called the pre-pulse contrast ratio. By way of illustration, and without limitation, a typical value for the pre-pulse contrast ratio can be 1000 or 2000.

In another embodiment of the present invention, a method is provided, using regenerative amplifier system 10, for producing amplified output pulses 40. In this embodiment, a high voltage pulse is generated with on and off voltage edges to drive electro-optic switch 20. The on and off voltage edges are applied to electro-optic switch 20 from control electronics 30. In previous systems, a pulse is chosen from the oscillator to begin the sequence of high voltage pulses for the amplification process. Then the on and off voltage edges are produced using a purely electronic delay. For the low-gain regenerative amplifier, the number of round trips is large and thus the delay of the off edge after the on edge can be 1 microsecond or as long as several microseconds. This time is much longer than the time required in high-gain regenerative amplifiers. The jitter in the timing of this edge is related to the total delay time for a purely electronic delay. In one embodiment of this invention, we count subsequent pulses from the oscillator to achieve the coarse delay of several microseconds. The fine delay is then achieved by an electronic delay or alternatively a piece of cable. Since the oscillator 22 has very low timing jitter over the period of a few microseconds, the jitter of the off edge is greatly decreased. In an alternative embodiment, the amplified pulses in the regenerative amplifier are used instead to trigger the off edge of the high voltage.

Figure 5:
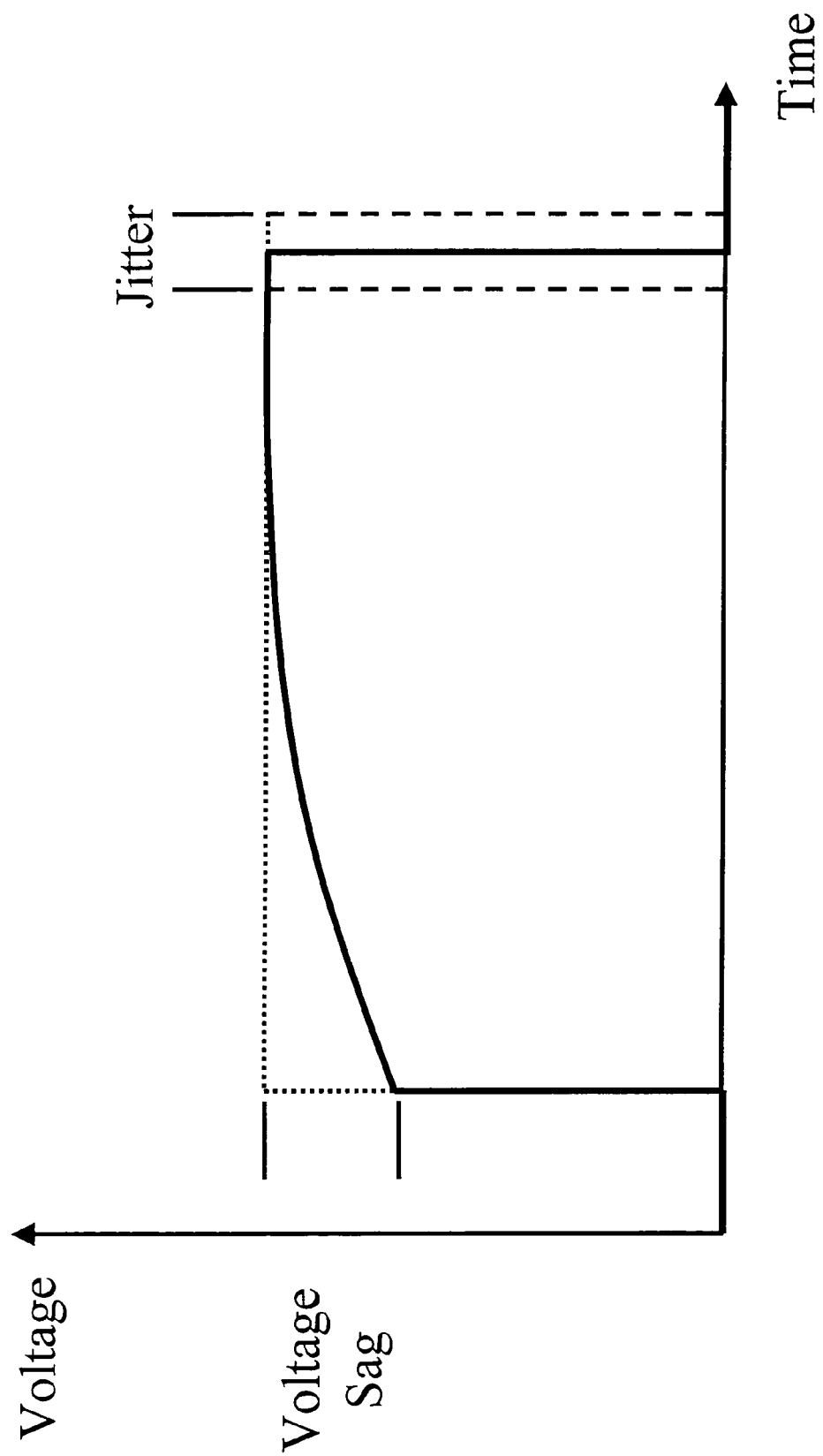
FIG. 5 illustrates an embodiment of the present invention where the voltage applied to the electro-optic switch, of the FIG. 1 system, as a function of time, with the voltage sag and the jitter in the trailing edge of the voltage.

Turning now to FIG. 5, the voltage applied to electro-optic switch 20 is shown. Ideally, the voltage is exactly the quarter wave voltage for the entire time that cavity 12 is open. In this way there is minimum loss during the entire time that amplified output pulse 40 is building up. However, it is not possible to keep this voltage constant and it gradually increases (or decreases) at later times. For a low-gain regenerative amplifier, this is particularly problematic. First, the number of round trips required in the cavity to saturate the gain and generate the maximum power is greater. This means that the cavity must be kept open longer and the voltage sag will be greater. Second, the sensitivity to excess loss is greater because the gain is lower.

In one embodiment of the present invention, the voltage value is adjusted so that the voltage profile is exactly the quarter wave voltage at the end of the high voltage pulse. In this way, the pre-pulses that are output from the regenerative amplifier system 10 are minimized. This is because the pulses leaking out of regenerative amplifier system 10 are smaller at earlier times because they have not yet been amplified. One consequence of this choice is that more than a single pulse can be injected into cavity 12 when it is first opened, and the voltage is less than the quarter wave value. If only a Faraday isolator is used prior to injecting pulses into the cavity, many pulses will be injected and an additional number of pre-pulses will be generated. With one embodiment of the present invention, electro-optic switch 18 is between the oscillator and the amplifier to pick a single pulse for injection and thus avoid this problem of injecting multiple pulses.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A regenerative amplifier system, comprising:
   a pump source that produces a pump beam;
   first and second mirrors that define a resonant cavity
   a gain medium positioned in the resonant cavity and optically coupled to the pump source;

an oscillator that produces multiple seed pulses;
a first electro-optic switch positioned external to the cavity, the first electro-optic switch configured to provide selection of a single seed pulse for the cavity and directs an amplified pulse produced in the cavity in a direction away from the oscillator, and
a second electro-optic switch positioned in the cavity that switches the seed pulse in and out of the cavity.

2. The system of claim 1, wherein the first and second electro-optic switches are Pockels cells.

3. The system of claim 1, wherein the gain media is selected from Yb:KGW, Yb:KYW, Yb:YAG, Yb:SYS, Yb:BOYS, Yb:GdCOB, Yb:glass, Nd:KGW, Nd:glass, Cr:LiSAF, Cr:LiCAF, Ti:sapphire, Nd:YAG, Nd:YLF and Nd:YVO$_4$.

4. The system of claim 1, wherein the gain media is Yb:KGW.

5. The system of claim 1, wherein the pump beam has a power in the range of 1–100 W.

6. The system of claim 1, wherein the pump beam has a power in the range of 1–30 W.

7. The system of claim 1, wherein the pump beam has a power in the range of 1–10 W.

8. The system of claim 1, wherein the pump beam has a wavelength in the range of 800 to 1000 nm.

9. The system of claim 1, wherein the seed pulse has a duration in the range of about 100 fs.

10. The system of claim 1, wherein the seed pulse has a duration in the range of about 300 fs.

11. The system of claim 1, wherein the seed pulse has a duration in the range of about 1 ps.

12. The system of claim 1, wherein the stretched seed pulse has a duration in the range of about 100 ps.

13. The system of claim 1, wherein the stretched seed pulse has a duration in the range of about 300 ps.

14. The system of claim 1, wherein the stretched seed pulse has a duration in the range of about 1 ns.

15. The system of claim 1, wherein the full power of the seed pulse can be switched in to the cavity.

16. The system of claim 1, wherein the undesired seed pulses do not pass through the gain medium.

17. The system of claim 1, wherein the pump source is selected from a diode, a diode bar, a fiber-coupled diode bar, and a single fiber-coupled diode bar.

18. The system of claim 1, wherein the pump source is a single fiber-coupled diode source.

19. A method for producing an amplified pulse from a regenerative amplifier system, comprising:

producing a pump beam from a pump source;
producing multiple seed pulses from the oscillator;
selecting a single seed pulse for the cavity; and
excluding the undesired seed pulses from the cavity, and switching the seed pulse in and out of the cavity; and
directing an amplified pulse produced in the cavity in a direction away from the oscillator.

20. The method of claim 19, wherein the regenerative amplifier system includes a cavity, gain medium, first and second electro-optic switches and an oscillator.

21. The method of claim 19, wherein selecting the single seed pulse for the cavity improves a contrast ratio of the amplified pulse to a pre-pulse.

22. The method of claim 19, wherein the first electro-optic switch is positioned external to the cavity, and the second electro-optic switch is positioned in the cavity.

23. The method of claim 22, wherein the first electro-optic switch selects the single seed pulse for the cavity.

24. The method of claim 22, wherein the second electro-optic switch switches the seed pulse in and out of the cavity.

25. The method of claim 22, wherein the first electro-optic switch directs the amplified pulse produced in the cavity in a direction away from the oscillator.

26. A method for producing an amplified pulse, comprising:

providing a regenerative amplifier system that includes a cavity, gain medium, an electro-optic switch for switching a pulse in to and out of the amplifier and an oscillator;
producing a pump beam from a pump source;
producing multiple seed pulses from the oscillator;
generating a high voltage pulse with on and off voltage edges to drive the electro-optic switch; and
synchronizing the on and off voltage edges applied to the electro-optic switch by counting pulses from the oscillator.

27. The method of claim 26, wherein synchronizing the on and off voltage edges applied to the electro-optic switch reduces jitter in the voltage edges.

28. The method of claim 26, wherein synchronizing the on and off voltage edges applied to the electro-optic switch increases the pre-pulse contrast ratio.

29. The method of claim 26, wherein synchronizing the on and off voltage edges applied to the electro-optic switch increases the post-pulse contrast ratio.

* * * * *